(12) United States Patent
Cmich

(10) Patent No.: US 10,730,344 B2
(45) Date of Patent: *Aug. 4, 2020

(54) LOW IMPACT TURF WHEEL

(71) Applicant: MTD PRODUCTS INC, Valley City, OH (US)

(72) Inventor: Ryan Cmich, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,253

(22) Filed: Jun. 27, 2019

(65) Prior Publication Data

US 2019/0322130 A1 Oct. 24, 2019

Related U.S. Application Data

(63) Continuation of application No. PCT/US2018/062530, filed on Nov. 27, 2018.
(Continued)

(51) Int. Cl.
*B60B 19/00* (2006.01)
*A01D 34/82* (2006.01)
(Continued)

(52) U.S. Cl.
CPC .............. *B60B 19/00* (2013.01); *A01D 34/82* (2013.01); *B60B 15/025* (2013.01); *B60B 15/08* (2013.01); *A01D 34/008* (2013.01); *B60B 2900/111* (2013.01); *B60B 2900/112* (2013.01); *B60B 2900/211* (2013.01); *B60B 2900/721* (2013.01)

(58) Field of Classification Search
CPC ....... B60B 15/00; B60B 15/02; B60B 15/023; B60B 15/025; B60B 15/026; B60B 15/08; B60B 19/00
See application file for complete search history.

(56) References Cited

U.S. PATENT DOCUMENTS

D54,288 S  * 12/1919 Stothoff ........................ D12/211
3,241,887 A * 3/1966 Winters ............... A01B 33/028
301/43
(Continued)

FOREIGN PATENT DOCUMENTS

BE        1009522 A3   4/1997
CN     201980011 U    9/2011
(Continued)

OTHER PUBLICATIONS

International Search Report and Written Opinion issued in related International Application No. PCT/US2018/062530 dated May 20, 2019, pp. 1-16.

*Primary Examiner* — Jason R Bellinger
(74) *Attorney, Agent, or Firm* — Wegman Hessler

(57) ABSTRACT

A low impact turf wheel having a wheel rim including an inner and outer surface, a plurality of pegs extending radially outward from the outer surface of the wheel rim, wherein the plurality of pegs maintain the wheel rim above an area of turf, and a hub. A turf wheel having a wheel rim having an inner and outer surface, a plurality of pegs extending radially outward from the outer surface of the wheel rim, wherein the peg comprises a stem, a collar and a lug, and wherein the lug includes a limited surface area to provide a ground contacting tread, and a hub.

15 Claims, 6 Drawing Sheets

Related U.S. Application Data

(60) Provisional application No. 62/591,277, filed on Nov. 28, 2017.

(51) Int. Cl.
  *B60B 15/02* (2006.01)
  *B60B 15/08* (2006.01)
  *A01D 34/00* (2006.01)

(56) References Cited

U.S. PATENT DOCUMENTS

| | | | | |
|---|---|---|---|---|
| 3,630,257 A | * | 12/1971 | Goldberger | B60C 7/102 152/301 |
| 3,650,185 A | * | 3/1972 | Takata | E02D 3/026 404/121 |
| 4,059,229 A | * | 11/1977 | Pescetto | A01G 25/09 239/728 |
| 5,769,507 A | * | 6/1998 | Brockway | B60B 15/00 172/554 |
| 7,198,333 B1 | * | 4/2007 | Freeman | B60B 15/025 301/43 |
| RE43,381 E | * | 5/2012 | Brockway | E02D 3/026 172/554 |
| D794,089 S | | 8/2017 | Maibach et al. | |

FOREIGN PATENT DOCUMENTS

| | | | |
|---|---|---|---|
| GB | 2467956 A | 8/2010 | |
| GB | 2513113 A | 10/2014 | |

* cited by examiner

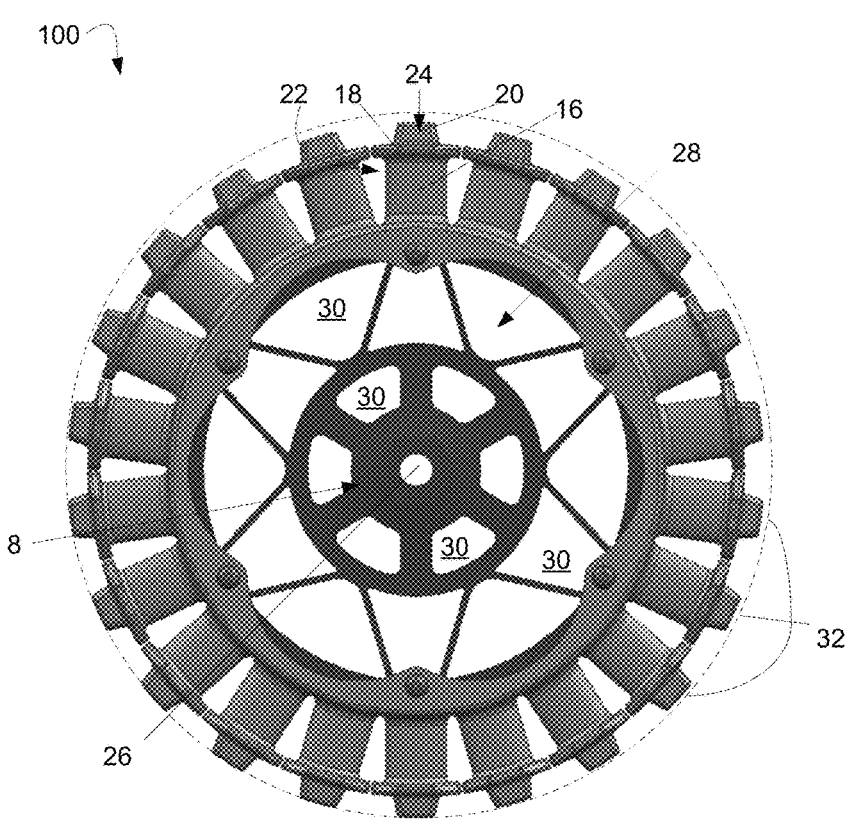
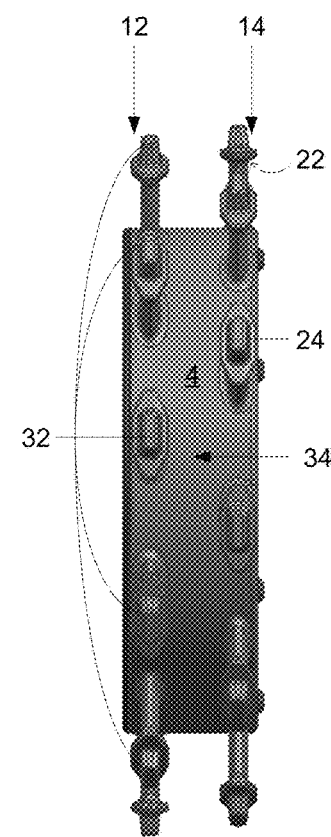
FIG. 4A
FIG. 4B

LOW IMPACT TURF WHEEL

CROSS REFERENCE TO RELATED APPLICATIONS

This application is a continuation of, and claims the priority filing benefit of, International PCT Application PCT/US2018/062530 filed Nov. 27, 2018, and U.S. Provisional Patent Application Ser. No. 62/591,277 filed Nov. 28, 2017. Each of the above listed applications is incorporated herein by reference.

FIELD OF THE INVENTION

The disclosed technology is generally directed to a wheel for mowers, and for other outdoor equipment having wheels. The disclosed technology relates to a low impact turf wheel to significantly reduce the adverse effects of frequent travel over turf by a lawn mower and provides resistance to build-up.

BACKGROUND OF THE INVENTION

Wheel marks and ruts in an area of mowed turf are unsightly and undesirable. During operation, the mower wheels, carrying the full weight of the mower, compress the grass blades downward towards the underlying soil. The compressed grass blades cannot regain their upright posture quickly enough to be cut by the mower blade, resulting in an uneven cut. As the strips of uncut grass spring up later, the turf can take on a streaked appearance. This is a particularly common problem when the grass is cut while damp or wet.

Many robotic mowers operate in a random pattern spending significantly more time traveling across a lawn than in the case of a human controlled mower. The robotic mower travels many times over some of the same areas of a lawn, and any features of the mower that are in contact with the turf can create observable wear, and in many cases, observable damage to the turf. Further, due to the constraints of battery operation, robotic mower cutting systems do not generally move as much air as conventional mowers. Without the air movement, grass that has been pushed down or laid over by the mower wheels is not drawn up into the mower cutting system.

As robotic mowers can operate without human oversight for extended periods of time, there are many instances where these products encounter obstacles and/or difficult terrain. In such instances, conventional robotic mower wheels do not provide enough traction for the mower to free itself from entrapment. Therefore, a human operator is required to locate the mower during its operation and free it manually.

Further, in order to maintain large areas, many robotic mowers must operate in all weather conditions, (i.e. rain or shine). When mowing in wet conditions, conventional tread wheels tend to collect cut grass in the form of a continuous band of material around the circumference. These bands or clumps of cut grass are known to build quite large over time, and can adversely affect the performance of the mower, and/or will separate from the wheel leaving an objectionable clump of material on the lawn surface.

SUMMARY OF THE INVENTION

The disclosed technology generally described hereinafter provides for a low impact turf wheel which provides for a resistance to build-up. According to one aspect of the disclosed technology, a low impact turf wheel is disclosed. The turf wheel comprises a wheel rim having an inner and outer surface; a plurality of pegs extending radially outward from the outer surface of the wheel rim, wherein the plurality of pegs maintain the wheel rim above an area of turf; and a hub.

In some embodiments, the plurality of pegs provide a ground contacting tread comprising the plurality of pegs and tread voids. In some embodiments, the ground contacting tread comprises less than about 50% of the surface area of the outer surface of the wheel rim. In some embodiments, the ground contacting tread comprises between about 30% to 35% of the surface area of the outer surface of the wheel rim. In some embodiments, the ground contacting tread comprises between about 10% to 50% of the surface area of the outer surface of the wheel rim.

In some embodiments, the plurality of pegs are evenly distributed about the outer surface of the wheel rim. In some embodiments, the hub comprises a central hub, a branched network and a plurality of apertures.

In yet another aspect of the disclosed technology, a turf wheel is disclosed. The turf wheel comprises a wheel rim having an inner and outer surface; a plurality of pegs extending radially outward from the outer surface of the wheel rim, wherein the peg comprises a stem, a collar and a lug, wherein the lug includes a limited surface area to provide a ground contacting tread; and a hub.

In some embodiments, the stem extends perpendicularly from the wheel rim. In some embodiments, the collar creates an overhang extending perpendicularly outward from the stem. In some embodiments, the overhang prevents build-up of turf material on or around the stem. In some embodiments, the plurality of pegs maintain the wheel rim above an area of turf. In some embodiments, the ground contacting tread comprises between about 10% to 50% of the total surface area of the outer surface of the wheel rim. In some embodiments, the hub further comprises a central hub, a branched network and a plurality of apertures.

In yet another aspect of the disclosed technology, a turf wheel is disclosed. The turf wheel comprises a wheel rim having an inner and outer surface; a plurality of pegs extending radially outward from the outer surface of the wheel rim, wherein the plurality of pegs maintain the wheel rim above an area of turf and provide a ground contacting tread; a non-continuous tread comprising the ground contacting tread and tread voids; and a hub.

In some embodiments, the ground contacting tread comprises about 30% and the tread voids comprise about 70% of the surface area of the outer surface of the wheel rim. In some embodiments, the peg further comprises stem, a collar and a lug, wherein the lug includes a limited surface area of which to engage an area of turf.

In some embodiments, the turf wheel further comprises a contact surface ratio of about 1:3, wherein the contact surface ratio is the ratio of the ground contacting tread to the surface area of the outer surface of the wheel rim. In some embodiments, the hub comprises a central portion and a branched network. In some embodiments, the branched network extends radially outward from the central hub and is affixed to the wheel rim. In some embodiments, the branched network includes a web structure separated by a plurality of apertures. In some embodiments, the web structure prevents a build-up of turf material in or around the central hub.

BRIEF DESCRIPTION OF SEVERAL VIEWS OF THE DRAWINGS

These and other features of the disclosed technology, and the advantages, are illustrated specifically in embodiments now to be described, by way of example, with reference to the accompanying diagrammatic drawings, in which:

FIGS. 4A-4B are front and side views, respectively, of an illustrative embodiment of the disclosed technology;

Figure 1:
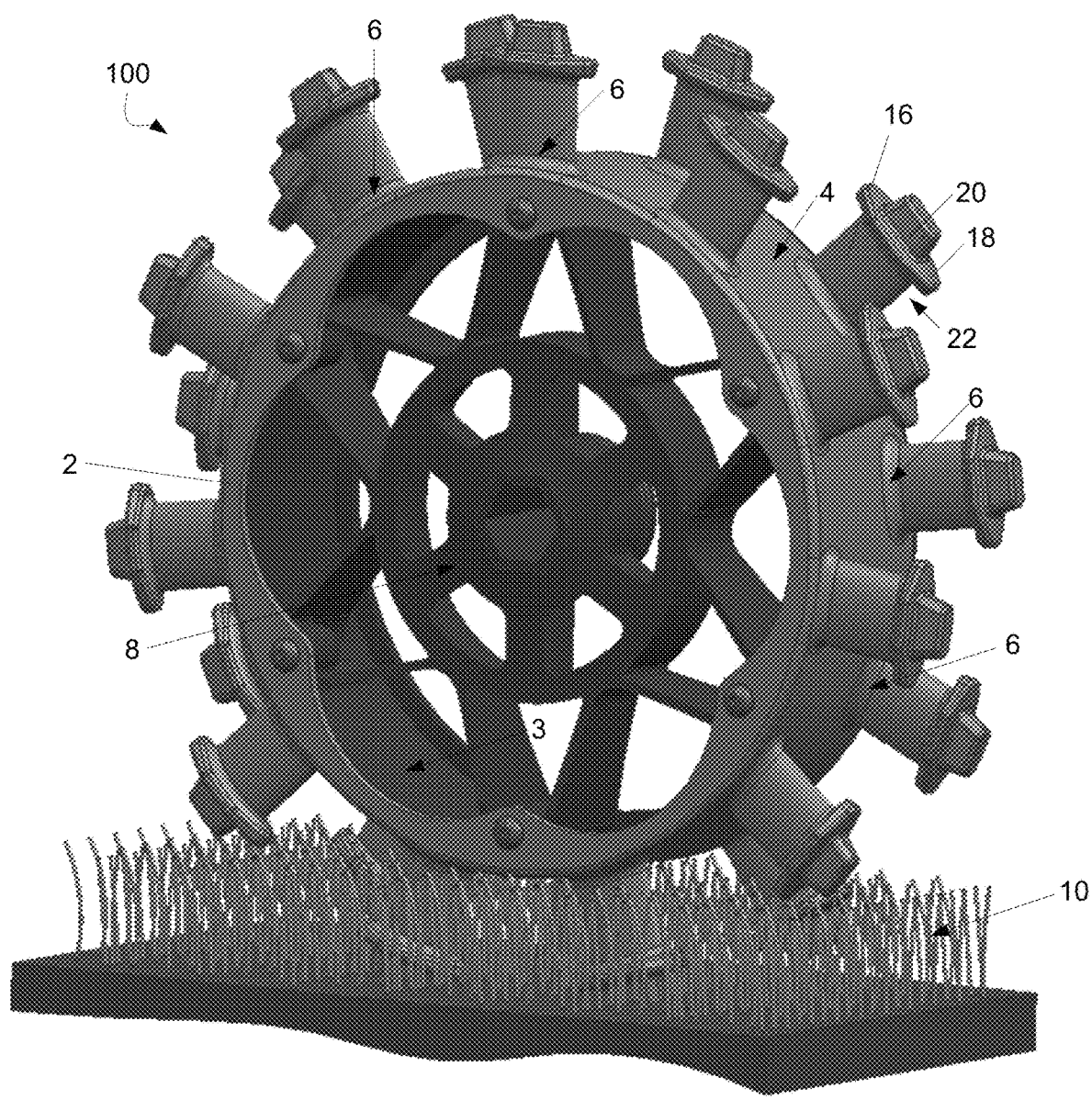
FIG. 1 is a partial rotated view of an illustrative embodiment of the disclosed technology.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION OF THE EMBODIMENTS

The following terms are used throughout the description, the definitions of which are provided herein to assist in understanding various aspects of the subject disclosure.

As used herein, the terms "low impact turf wheel", "turf wheel" and "wheel" are used interchangeably and refer to a wheel on most any autonomous mower.

As used herein, the terms "robot mower", "robotic mower" and "mower" are used interchangeably and refer to most any autonomous mower.

As used herein, the terms "turf", "turf material", and "material" are used interchangeably and refer to most any type of grass or turf, grass or turf clippings, wet grass or turf, leaves, small plants or branches, dirt and/or mud.

As used herein, the term "area of turf" refers to numerous types and varieties of grasses, such as those used on lawns, athletic fields, sports fields, and/or other soil, landscape or terrain.

The disclosed technology generally described hereinafter provides for a low impact turf wheel 100. With existing products, and contrast to the disclosed technology, the tracks left by mower wheels are typically visible for an hour or more after a mowing session. Since many robotic mowers mow in a random pattern, these tracks in random directions can be objectionable to users. This effect is worsened when the soil is very wet, as the turf which is laid down by the wheels becomes coated in mud, making the track marks that much more evident.

As such, the low impact turf wheel 100 disclosed herein significantly reduces the adverse effects of frequent travel over turf by a robotic lawn mower. The features described herein reduce the long-term damage to areas of very high traffic (on-wire and in front of a charge station), and also reduce the short-term cosmetic effects that accompany conventional wheels used on existing products.

With reference to FIG. 1, a low impact turf wheel 100 is shown. The low impact turf wheel 100 comprises a wheel rim 2 having an inner surface 3 and an outer surface 4, a plurality of pegs 6, and a hub 8. The plurality of pegs 6 extend radially outward from the outer surface 4 of the wheel rim 2. The low impact turf wheel 100 is structured and operable to allow turf to pass through the plurality of pegs 6, yet maintain the wheel rim 2 above an area of turf, as the mower rolls across the ground without flattening, compressing or compacting the turf against the ground.

The low impact turf wheel 100 may be an integrally-formed, one-piece member. It should be understood that the low impact turf wheel 100 can be formed of most any material sufficient to be rigid enough to provide support to the robotic mower, while also being substantially lightweight. In some embodiments, the low impact turf wheel 100 is made in one piece. In other embodiments, the wheel rim 2 is formed separately from the hub 8, wherein the wheel rim 2 and the hub 8 are attached or fixedly-attached to each other to form the turf wheel 100.

The wheel rim 2 is substantially circular, having an inner surface 3 and an outer surface 4. The wheel rim 2 has a diameter and a circumference, where the outer surface 4 extends circumferentially about the wheel rim circumference. The plurality of pegs 6 are located on the outer surface 4 of the wheel rim 2. In some embodiments, the plurality of pegs 6 are evenly distributed about the outer surface 4 of the wheel rim 2.

Figure 2:
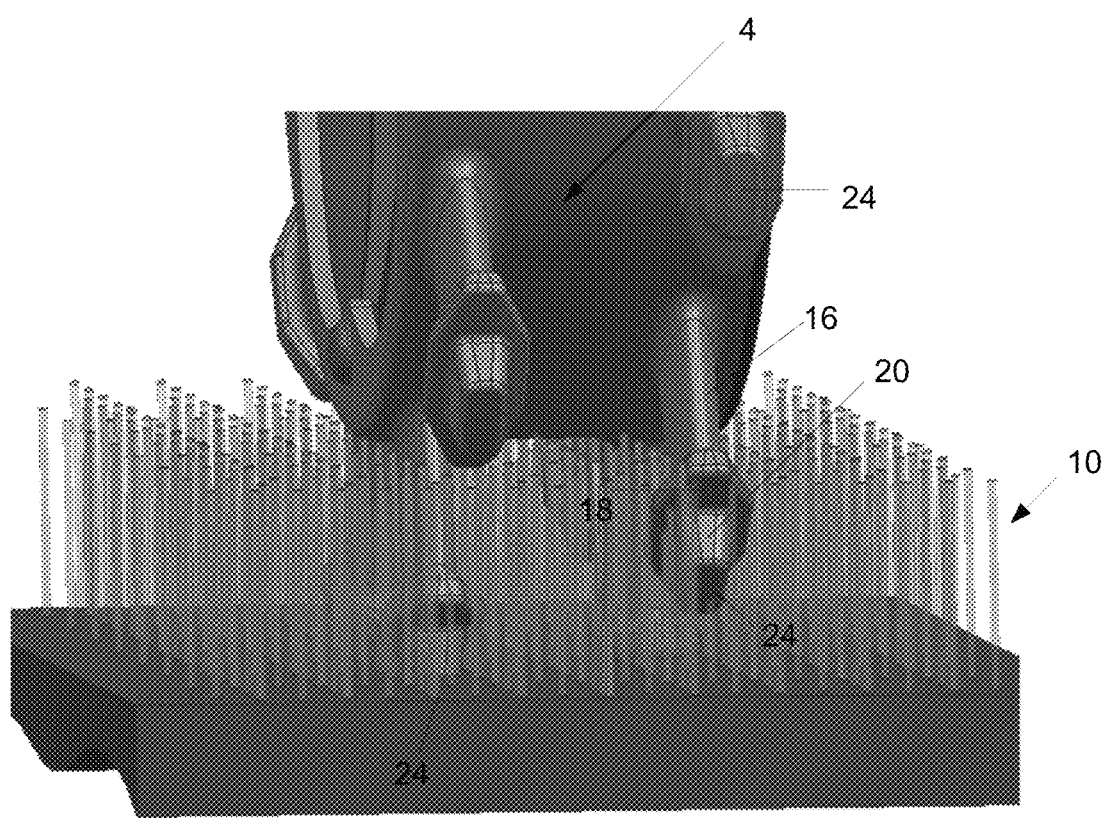
FIG. 2 is a schematic of an illustrative embodiment of the disclosed technology.

As shown in FIG. 2, the plurality of pegs 6 are employed to maintain the outer surface 4 of the wheel rim 2 above an area of turf 10. To maintain the outer surface of the wheel rim above an area of turf should be understood to mean that the plurality of pegs 6 support the outer surface 4 of the wheel rim 2 in a position above the turf, so as it does not compress an area of turf, or where the outer surface 4 does not come in direct contact with the ground. The plurality of pegs 6 allow for turf to brush up against the outer surface 4 and to pass through the plurality of pegs 6, yet maintain the outer surface 4 of the wheel rim 2 above the turf, without flattening, compressing, or compacting an area of turf against the ground, or damaging the individual grass stems or an area of turf. This minimizes the influence of the wheels (i.e. prevents crushing, flattening, breakage, etc.) on the grass stems and/or turf area, which prevents damage and ultimately prevents or reduces wheel marks and strips of uncut grass, indicative of the traveling path of a robotic mower caused during operation.

It should be understood that the plurality of pegs 6 can be formed of the same or different material than that which comprises the wheel rim 2. It should also be understood that the size and quantity of pegs 6 is a function of the wheel rim 2 diameter, the mass of the object being supported (e.g. a robotic mower), and the composition of the area of turf where the low impact turf wheel 100 will be operating.

With reference to FIGS. 1-2, the peg 6 comprises a stem 16, a collar 18, and a lug 20, located at the distal end of the peg 6. The plurality of pegs 6 provides superior traction in a number of adverse conditions due to the combination of the stem 16, collar 18, and lug 20. Traction is provided by the plurality of pegs 6, which extend radially outward from the outer surface 4 of the wheel rim 2.

In conditions of soft or loose turf, the plurality of pegs 6 may penetrate an area of turf 10, thus engaging more pegs 6 to further increase tractive forces. The open spacing of the pegs 6, due to the pegs 6 being offset from one another, allow for deeper engagement of objects, such as rocks or branches, allowing the plurality of pegs 6 to "climb" over large objects located within an area of turf.

The stem 16 extends perpendicularly from the outer surface 4 of the wheel rim 2. In some embodiments, the stem 16 is substantially rectangular in shape, wherein the length of the stem 16 is greater than its width. It should be understood that the stem 16 can be formed into any shape sufficient to maintain the wheel rim 2 above an area of turf 10, and also to obtain access to the turf with minimal disturbance or damage thereto.

The collar 18 extends perpendicularly outward from the stem 16, thus creating an overhang 22. The collar 18 prevents turf material from slowly working up the sides of the stem 16. By preventing or minimizing turf material from building up on or around the stem 16, turf material is prevented from building up on or against the wheel rim 2, further preventing the turf wheel 100 from becoming impacted with turf material.

The lug 20 abuttingly engages with the collar 18. In some embodiments, the lug 20 is substantially trapezoidal in shape. It should be understood that the lug 20 can be any shape that will allow penetration of an area of turf to provide high grip capacity. It should also be understood that the lug 20 can be formed of the same or different material than that which comprises the stem 16.

As shown in FIG. 2, the lug 20 further includes a limited surface area on the lug face 24 of which directly contacts an area of turf 10. The lugs 20 provide a non-continuous tread surface that minimizes the impact of the wheels on the grass blades, thereby reducing or preventing damage to the turf. In combination, the lugs 20 lessen the number of grass blades that are compressed as the mower moves across the turf, thereby reducing wheel marks and strips of uncut grass. It should be understood that the lug face 24 can include a square, circular, triangular, rectangular, or most any other shaped frontal cross-section.

Figure 3:
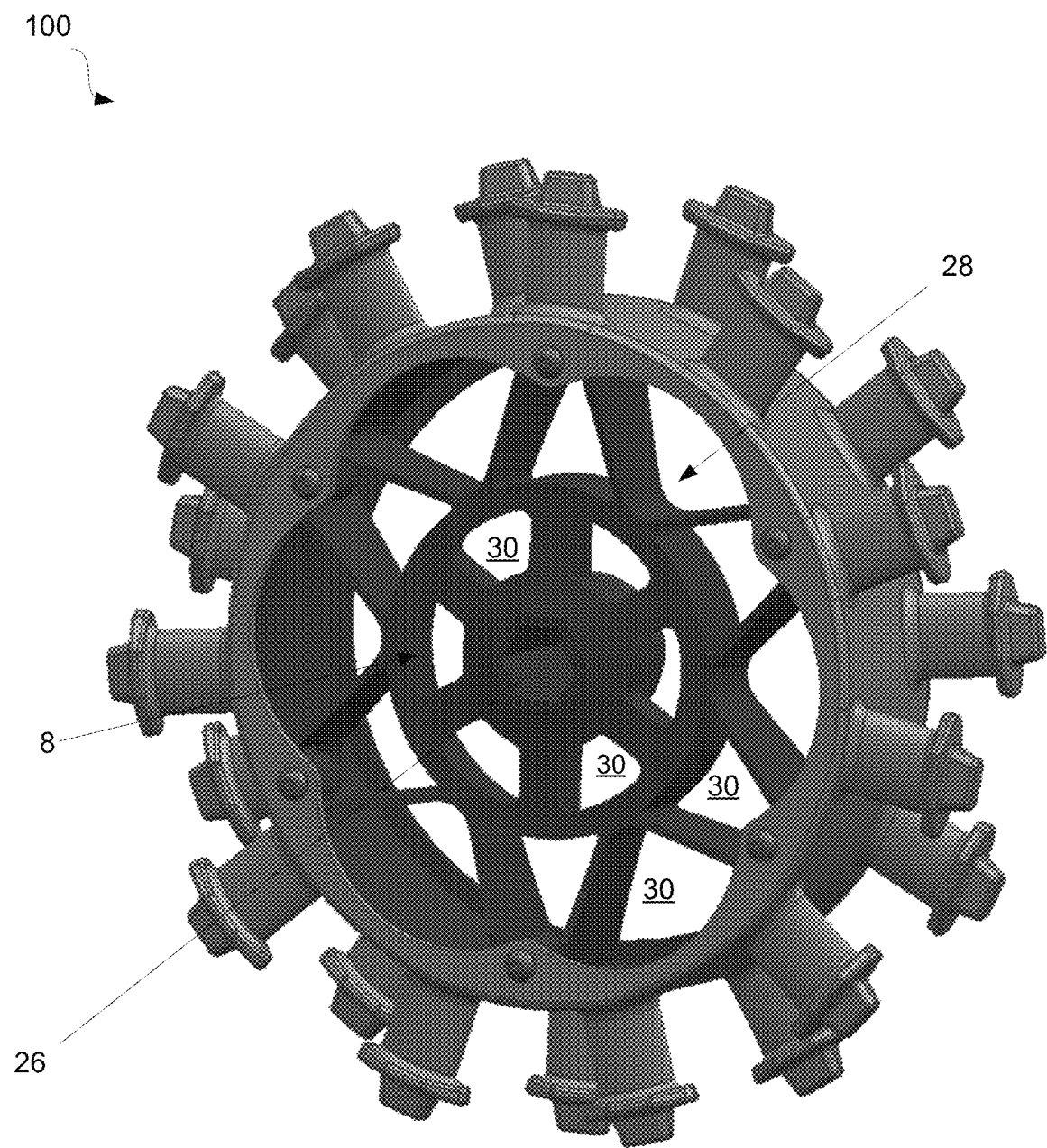
FIG. 3 is a partial rotated view of an illustrative embodiment of the disclosed technology.
Figures 5A, 5B, 5C, 5D:
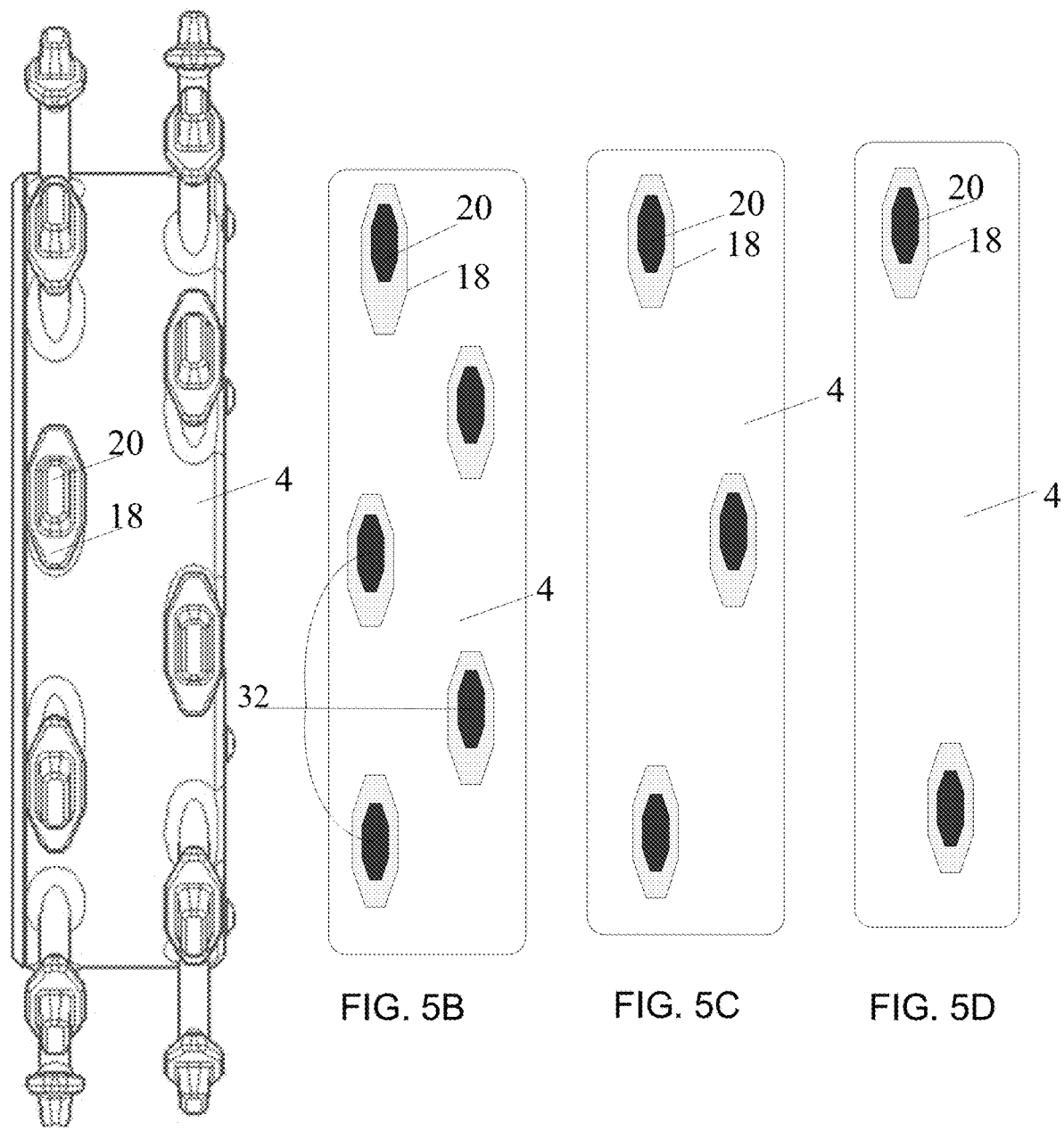
FIGS. 5A-5D are front views of illustrative embodiments of the disclosed technology.

With references to FIGS. 1, 3, and 4A, the hub 8 is shown. In some embodiments, the hub 8 comprises a central portion 26, a branched network 28 and a plurality of apertures 30. The central portion 26 provides for mounting of the turf wheel 100 to a robotic mower. For example, the central portion 26 is configured for receiving and operatively connecting the hub 8 to a drive shaft, drive mechanism (e.g. motion drive such as a gear motor), wheel axle, or the like, (the previous list of which are not shown in figures). In other embodiments, the hub 8 may only include the central portion 26.

As shown in FIG. 4A, the branched network 28 extends radially outward from the central portion 26 and is affixed to the wheel rim 2. In some embodiments, the branched network 28 comprises a web-like structure. In some embodiments, the branched network 28 includes a plurality of apertures 30.

The branched network 28 of the turf wheel 100 further reduces material costs, and provides a light-weight mower wheel.

With reference to FIGS. 4A-B and 5A-D, the turf wheel 100 provides a ground contacting tread 32 (as represented by dashed lines in FIG. 4A). The ground contacting tread 32 comprises the combination of the surface area provided by the lug faces 24 that contact the ground. The plurality of pegs 6, which provide the lug 20 and the lug face 24, are offset from one another, yet evenly distributed about the outer surface 4, as shown in FIGS. 4A-4B. In some embodiments, the plurality of pegs 6 comprises a first peg series 12 and a second peg series 14. In some embodiments, the first peg series 12 and the second peg series 14 are offset from one another to provide the ground contacting tread 32.

The ground contacting tread 32 further provides a non-continuous tread surface that prevent the turf or cut grass from joining together at the outer surface 4 of the wheel rim 2, and forming a continuous band of material. This allows the low impact turf wheel 100 to perform consistently through a range of conditions, provides resistance to build-up and reduces maintenance required of the user, and eliminates unsightly clumps of turf material in an area of turf.

In some embodiments, the turf wheel 100 comprises a contact surface ratio of about 1:3. It should be understood that the contact surface ratio provides the ratio of the ground contacting tread 32 (i.e. the limited ground contacting surface area provided by the combination of the lug faces 24) to the total surface area of the outer surface 4.

The ground contacting tread 32 extends circumferentially about the outer surface 4 of the wheel rim 2. Because the ground contacting tread 32 includes the plurality of pegs 6 that are spaced apart from one another, the plurality of pegs 6 are separated by spaces or tread voids 34, as shown in FIG. 4B. It will be appreciated that tread voids 34 can include open areas of any suitable size and/or shape and in most any suitable arrangement and/or configuration.

In some embodiments, the ground contacting tread 32 comprises about 30% and the tread voids 34 comprise about 70% of the total surface area of the outer surface 4 of the wheel rim 2. In some embodiments, the ground contacting tread 32 includes between about 10% to 50% of the total surface area of the outer surface 4 of the wheel rim 2. In an embodiment, an appropriate contact surface ratio can be established based on the weight and/or mass of the mower, and the expected or actual turf conditions.

Turning to FIGS. 5A-5D, front views of example embodiments of the disclosed technology are illustrated. The ground contacting tread 32, including the tread lugs 20, and in some embodiments the collars 18, provides a non-continuous tread surface. In some embodiments, the ground contacting tread 32 comprises between about 10% to 50% of the total surface area of the outer surface 4 of the wheel rim. In an embodiment, the ground contacting tread 32 comprises between about 10% to 40% of the total surface area of the outer surface 4 of the wheel rim. In an embodiment, the ground contacting tread 32 comprises about 30%-35% of the total surface area of the outer surface 4 of the wheel rim 2.

Figure 6:
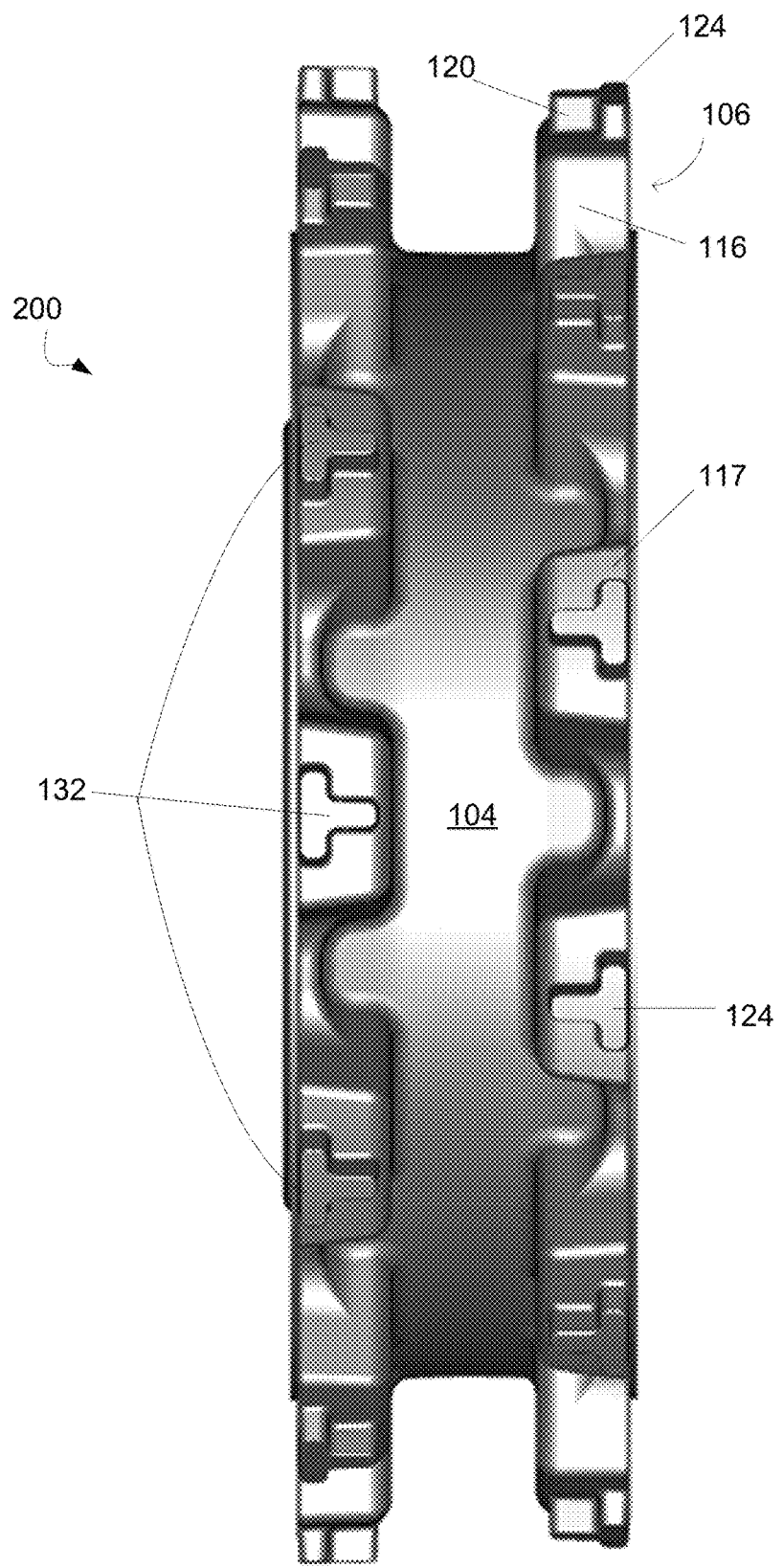
FIG. 6 is a side view of an illustrative embodiment of the disclosed technology.

With reference to FIG. 6, in an alternative embodiment, a turf wheel 200 is shown, wherein like parts have like numerals to those in FIGS. 1-5, plus 100. The low impact turf wheel 200 comprises a wheel rim (not shown in figure) having an inner surface (not shown in figure), an outer surface 104, and a plurality of pegs 106, wherein the plurality of pegs 106 extend radially outward from the outer surface 104.

As shown in FIG. 6, the peg 106 comprises a stem 116 and a lug 120, wherein the lug 120 includes a lug face 124. The configuration of the stem 116 and the lug 120 provides increased surface area in order to prevent the turf wheel 200 from sinking into wet, moist, or muddy soil while traversing the ground/terrain, and yet still provides superior traction.

The stem 116 extends perpendicularly from the outer surface 104. In some embodiments, the stem 116 is substantially rectangular in shape, wherein the length of the stem 116 is greater than its width. As shown in FIG. 6, the stem 116 further comprises a stem surface 117, wherein the lug 120 extends radially outward from the stem surface 117. In wet, moist, or muddy soil conditions, the lug 120 may penetrate or sink into the ground/terrain and mechanically engage it for tractive purposes. In such adverse conditions, the stem surface 117 provides adequate support to the turf wheel 200 in order to maintain the outer surface 104 above an area of turf without sinking, becoming stuck or fixed within the wet, moist or muddy soil, or preventing a decrease in traction or efficiency. The stem surface 117 can support the mass of the mower without sinking into the soil.

In some embodiments, the lug 120 is T-shaped. The T-shaped lug includes a transverse rib to increase tractive force in the tangential direction. However, it should be understood that the lug 120 can be of most any shape that provides increased tractive force to allow the turf wheel 200 to traverse wet, moist or muddy soil/terrain.

With reference to FIG. 6, the ground contacting tread 132, comprises a plurality of the tread lugs 120 and lug faces 124, providing a non-continuous tread surface. In some embodiments, the ground contacting tread 132 comprises between about 30% to 50% of the total surface area of the outer surface 104 of the wheel rim. In some embodiments, the ground contacting tread 132 comprises between about 30% to 35% of the total surface area of the outer surface 104 of the wheel rim, in other embodiments, between about 35% to 45% of the total surface area of the outer surface 104 of the wheel rim, and in other embodiments, about 45% to 50% of the total surface area of the outer surface 104 of the wheel rim.

While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A turf wheel, comprising:
   a wheel rim having an inner and outer surface;
   a plurality of pegs extending radially outward from the outer surface of the wheel rim, wherein the plurality of pegs each comprise a stem and a lug, wherein the plurality of pegs maintain the wheel rim above an area of turf and provide a ground contacting tread;
   a non-continuous tread comprising the ground contacting tread and tread voids; and
   a hub;
      wherein the lug further comprises a lug face, and wherein the lug face is T-shaped.

2. The turf wheel as recited in claim 1,
   wherein the ground contacting tread comprises 30% and the tread voids comprise 70% of the total surface area of the outer surface of the wheel rim.

3. The turf wheel as recited in claim 1, wherein each peg further comprises a collar extending perpendicularly outward from the stem.

4. The turf wheel as recited in claim 1, further comprising a contact surface ratio of 1:3, wherein the contact surface ratio is the ratio of the ground contacting tread to the total surface area of the outer surface of the wheel rim.

5. The turf wheel as recited in claim 1, wherein the hub comprises a central portion and a branched network.

6. The turf wheel as recited in claim 5, wherein the branched network extends radially outward from the central hub and is affixed to the wheel rim.

7. The turf wheel as recited in claim 6, wherein the branched network includes a web structure separated by a plurality of apertures.

8. The turf wheel as recited in claim 7, wherein the web structure prevents a build-up of turf material in or around the central hub.

9. The turf wheel as recited in claim 1, wherein said stem is substantially rectangular in shape.

10. The turf wheel as recited in claim 1, wherein the stem further comprises a stem surface.

11. The turf wheel as recited in claim 1, wherein the plurality of pegs are offset from one another yet evenly distributed about the outer surface of the wheel rim.

12. The turf wheel as recited in claim 1, wherein the plurality of pegs comprises a first peg series and a second peg series.

13. The turf wheel as recited in claim 12, wherein said first peg series and second peg series are offset from one another.

14. The turf wheel as recited in claim 3, wherein the lug abuttingly engages with the collar.

15. The turf wheel as recited in claim 1, wherein the ground contacting tread includes between 10% to 50% of the total surface area of the outer surface of the wheel rim.

\* \* \* \* \*